(12) United States Patent  
Beaulieu et al.

(10) Patent No.: US 7,651,676 B2
(45) Date of Patent: Jan. 26, 2010

(54) PROCESSES FOR TREATING ALUMINIUM DROSS RESIDUES

(75) Inventors: Martin Beaulieu, Ste-Foy (CA); Stéphane Chabot, Lévis (CA); Yves Charest, Ancienne-Lorette (CA); Jean-François Savard, Ste-Foy (CA)

(73) Assignee: Groupe Conseil Procd Inc., Quebec (CA)

( * ) Notice: Subject to any disclaimer, the term of this patent is extended or adjusted under 35 U.S.C. 154(b) by 0 days.

(21) Appl. No.: 11/944,567

(22) Filed: Nov. 23, 2007

(65) Prior Publication Data

US 2008/0159935 A1 Jul. 3, 2008

Related U.S. Application Data

(60) Provisional application No. 60/882,260, filed on Dec. 28, 2006.

(51) Int. Cl.
- *C01F 7/56* (2006.01)
- *C01F 7/30* (2006.01)
- *C22B 21/00* (2006.01)

(52) U.S. Cl. .............. 423/625; 423/122; 423/132; 423/495; 423/626

(58) Field of Classification Search ............ 423/122, 423/126, 132, 495, 625, 626
See application file for complete search history.

(56) References Cited

U.S. PATENT DOCUMENTS

| | | | |
|---|---|---|---|
| 752,927 A | 2/1904 | Schwahn | |
| 1,519,880 A | 12/1924 | Specketer et al. | |
| 1,646,732 A | 10/1927 | Lea et al. | |
| 1,752,599 A | 4/1930 | Kjellgren | |
| 1,868,499 A | 7/1932 | Guertler | |
| 2,217,099 A | 10/1940 | Burman | |
| 2,413,709 A | 1/1947 | Hoffman | |
| 3,169,827 A | 2/1965 | de Rosset et al. | |
| 3,620,671 A * | 11/1971 | Maurel et al. | 423/128 |
| 4,039,726 A | 8/1977 | Carr et al. | |
| 4,224,287 A * | 9/1980 | Ziegenbalg et al. | 423/112 |
| 4,252,777 A * | 2/1981 | McDowell et al. | 423/111 |
| 4,320,098 A | 3/1982 | Huckabay et al. | |
| 4,348,366 A | 9/1982 | Brown et al. | |
| 4,428,912 A * | 1/1984 | Reynolds et al. | 423/132 |
| 4,959,100 A | 9/1990 | Dubé et al. | |
| 4,960,460 A | 10/1990 | Dubé et al. | |
| 5,102,453 A | 4/1992 | Yerushalmi | |
| 5,407,459 A | 4/1995 | Breault et al. | |
| 5,585,080 A * | 12/1996 | Andersen et al. | 423/126 |
| 5,613,996 A | 3/1997 | Lindsay | |
| 5,716,426 A | 2/1998 | Beelen et al. | |
| 6,110,434 A | 8/2000 | Pickens et al. | |
| 2004/0259718 A1 | 12/2004 | Feige et al. | |

\* cited by examiner

*Primary Examiner*—Ngoc-Yen M Nguyen
(74) *Attorney, Agent, or Firm*—Bereskin & Parr LLP/S.E.N.C.R.L., srl

(57) ABSTRACT

There is provided a process for preparing aluminium chloride comprising: leaching aluminium dross residues with HCl so as to obtain a mixture comprising a solid and a liquid; and hydrochlorinating the liquid obtained from the mixture, so as to form a precipitate comprising aluminium chloride. Such a sequence can also be used for preparing alumina. In such a case, the process can further comprise the step of converting the so-obtained aluminium chloride into alumina. In the processes previously defined, the solid so-obtained can also be leached with $H_2SO_4$, thereby generating a leachate. The leachate can also eventually be hydrochlorinated so as to increase the yield of the desired product obtained i.e. alumina or aluminium chloride.

24 Claims, 2 Drawing Sheets

```
┌─────────────────────────────────────────────────────┐
│ LEACHING ALUMINIUM DROSS RESIDUES WITH              │
│ HCL AND OBTAINING A SOLID AND A LIQUID              │
└─────────────────────────────────────────────────────┘
                          │
                          ▼
┌─────────────────────────────────────────────────────┐
│ SEPARATING THE LIQUID AND THE                       │
│ SOLID FROM ONE ANOTHER                              │
└─────────────────────────────────────────────────────┘
                          │
                          ▼
┌─────────────────────────────────────────────────────┐
│ HYDROCHLORINATING THE LIQUID AND OBTAINING A        │
│ PRECIPITATE COMPRISING ALUMINIUM CHLORIDE           │
└─────────────────────────────────────────────────────┘
```

Fig. 1

PROCESSES FOR TREATING ALUMINIUM DROSS RESIDUES

CROSS-REFERENCE TO RELATED APPLICATION

The present application claims priority on U.S. provisional application No. 60/882,260 filed on Dec. 28, 2006 which is incorporated herein by reference in its entirety.

TECHNICAL FIELD

The present invention relates to improvements in the field of inorganic chemistry applied to aluminium dross residues. In particular, this invention relates to processes for treating aluminium dross residues.

BACKGROUND OF THE INVENTION

In the production of aluminium (aluminium smelters) or melting of aluminium (eg. for manufacture of extrusions, ingots and billets) a by-product called aluminium dross is formed. Such a by-product is formed in molten aluminium in view of oxygen from environmental air as well as impurities present in aluminium. Aluminium dross generally comprises free metal and non-metallic substances (e.g. aluminium oxide and salts). Aluminium nitrides and carbides may also be present, as well as metals oxides derived from molten alloy. Aluminium dross does represent and interesting by-product to valorize in order to recuperate or recover the products contained therein.

It is known to process the dross first by separating aluminium from it to obtain aluminium dross residues, which are also known as non-metallic products (NMP). In other words it can be said that aluminium dross residues are obtained by at least partially removing aluminium metallic from aluminium dross. Aluminium dross is normally treated either by a plasma or in a conventional furnace with a salt mixture, to remove recoverable aluminum metal, leaving a dross residue having reduced aluminum content.

The main components of aluminium dross residues generally include, for example, alumina, aluminum metallic and spinel. Other main components such as aluminum nitride, gibbsite ($Al(OH)_3$), and diaoyudaoite ($NaAl_{11}O_{17}$) can also be present. Various minor components such as $Fe_2O_3$, $SiO_2$, MgO can also be present.

Dube et al. in U.S. Pat. Nos. 4,959,100 and 4,960,460 disclose treatment processes for recovering aluminum from aluminum dross hence producing aluminum dross residues. Such aluminium dross residues are also disclosed in U.S. Pat. No. 5,407,459, and known as NOVAL™.

Formerly aluminium dross residues originating from known dross processing techniques in rotating salt furnaces were put in a landfill as waste. Such disposal is increasingly facing environmental problems or is even banned, since salts can leach from the aluminium dross residues and pass into the soil below. Aluminum dross residues are frequently classified as hazardous material. Therefore, the disposal, transformation or valorization of the aluminium dross residues is of prime economic and environmental importance.

Several solutions have been proposed for recuperating aluminium from aluminium dross but only few have been proposed for valorizing or treating aluminium dross residues i.e. residues that are obtained after removal of aluminium from aluminium dross.

It would thus be highly desirable to be provided with a process that would propose an alternative way for valorizing aluminium dross residues into a product, which is different than calcium aluminates.

SUMMARY OF THE INVENTION

According to one aspect of the invention, there is provided a process for preparing aluminium chloride comprising:
 a) leaching aluminium dross residues with HCl so as to obtain a mixture comprising a solid and a liquid; and
 b) hydrochlorinating the liquid obtained from the mixture, thereby forming a precipitate comprising aluminium chloride.

According to another aspect of the invention, there is provided a process for preparing aluminium chloride comprising:
 leaching aluminium dross residues with HCl so as to obtain a mixture comprising a solid and a liquid;
 leaching the solid with $H_2SO_4$ so as to obtain a leachate; and
 hydrochlorinating the liquid and the leachate, thereby forming a precipitate comprising aluminium chloride.

It was found that such processes are quite simple and that they can be carried out at low costs. It was also found that such processes propose efficient ways to valorize aluminium dross residues by converting the Al atoms comprised therein into aluminium chloride.

According to another aspect of the invention, there is provided a process for preparing alumina comprising:
 a) leaching aluminium dross residues with HCl so as to obtain a mixture comprising a solid and a liquid;
 b) hydrochlorinating the liquid obtained from the mixture, thereby forming a precipitate comprising aluminium chloride; and
 c) converting the aluminium chloride into alumina.

According to another aspect of the invention, there is provided a process for preparing alumina comprising:
 leaching aluminium dross residues with HCl so as to obtain a mixture comprising a solid and a liquid;
 leaching the solid with $H_2SO_4$ so as to obtain a leachate;
 hydrochlorinating the liquid and the leachate, thereby forming a precipitate comprising aluminium chloride; and
 converting the aluminium chloride into alumina.

It was found that such processes permit to recuperate, recover or extract very high yields of Al atoms from aluminium dross residues and convert them into alumina. It was found that by submitting aluminium dross residues with one or two leaching steps, i.e. one with HCl and optionally one with $H_2SO_4$, it was possible to valorize a very high percentage of the total weight aluminium dross residues and convert it into alumina. It was also found that by combining these two leaching steps, higher yields of Al atoms were recovered from aluminium dross residues, thereby giving higher conversion yields into alumina.

The expression "aluminium dross residues" as used herein refers to residues that are obtained by substantially removing the recoverable aluminum metal from aluminium dross. For example, the aluminium dross residues comprise alumina, aluminium metal and spinel ($MgAl_2O_4$). Some other compounds such as aluminum nitride, gibbsite ($Al(OH)_3$), and diaoyudaoite ($NaAl_{11}O_{17}$) can also be present at various proportions. Various minor components such as $Fe_2O_3$, $SiO_2$, MgO can also be present.

The term "SEROX™" as used herein refers to aluminium dross residues that comprise alumina, aluminium metal, spinel ($MgAl_2O_4$), and gibbsite ($Al(OH)_3$). Such residues can also comprises various other compounds, such as diaoyudaoite ($NaAl_{11}O_{17}$), sylvite (KCl), Halite (NaCl), Cryolite ($Na_3AlF_6$), mica, sodalite ($Na_4Al_3Si_3O_{12}Cl$), $Ca_2SiO_4$, albite ($NaAlSi_3O_8$), fluorite $CaF_2$, or mixtures thereof.

The term "NOVAL™"as used herein refers, for example, to aluminium dross residues that comprise alumina, aluminium, aluminium nitride, sodium oxide and magnesium oxide.

In the processes of the present invention, the HCl leaching step can be carried out at a temperature of about 20° C. to about 140° C. or about 40° C. to about 120° C. For example, the temperature can also be about 50° C. to about 100° C. or of about 80° C. Such a HCl leaching step can be, for example, carried out using a HCl solution having a concentration of about 10% to about 37%, about 20% to about 37%, or of about 37%. The leaching of the dross residues with HCl can be, for example, carried out over a period of about 2 to about 36 hours, or of about 4 to about 24 hours. For example, the period can be of about 6 to 12 hours or of about 8 hours. The liquid and solid obtained after the leaching with HCl are, for example, separated from one another before proceeding to a further step. Such a separation is, for example, carried out by means of a filtration or a centrifugation. The dross residues can comprise NOVAL™, SEROX™, or a mixture thereof. For example, the dross residues can comprise SEROX™.

In the processes of the present invention, the hydrochlorination can be, for example, carried out at a temperature of about –10° C. to about 20° C., of about –5° C. to about 10° C., or at about –40° C. Such a step is, for example, carried out using gaseous HCl. The hydrochlorination can be, for example, carried out over a period of about 0.5 to about 15 hours, about 1 to about 8 hours, about 2 to about 6 hours, or about 3 hours In the processes of the present invention, when only one leaching step is carried out i.e. HCl leaching step, at least 25%, or at least 35% by weight of the Al atoms contained in the aluminium dross residues can be, for example, converted into aluminium chloride. Alternatively, about 40 to about 45% by weight of the Al atoms contained in the aluminium dross residues can be converted into aluminium chloride. The aluminium chloride so-obtained can further be washed with HCl and optionally milled. For example, at least 25%, or at least 30% by weight of the Al atoms contained in the aluminium dross residues can be extracted therefrom. Alternatively, about 40% to about 45% by weight of the alumina contained in the aluminium dross residues can be extracted therefrom.

In the processes of the present invention, when two leaching steps are carried out i.e. a HCl leaching step and a $H_2SO_4$ leaching step, the solid from the mixture is, for example, separated from the liquid before being leached with $H_2SO_4$. Such a separation can be carried out by means of a filtration or a centrifugation. When the solid is leached with $H_2SO_4$, another mixture containing a solid and an aqueous phase can be obtained. The leachate is, for example, obtained by treating the solid from the other mixture with an aqueous solution so as to solubilize the minerals and metals (such as sulphates) contained therein. The aqueous solution can be hot water for example having a temperature of at least 60, 70, 85, 90 or 95° C.

The liquid and the leachate can be, for example, mixed together and can then be hydrochlorinated. Alternatively, they can be hydrochlorinated separately. The aluminium chloride so-obtained can be milled. The leaching of the solid can be, for example, carried out at a temperature of about 20° C. to about 325° C., about 60° C. to about 300° C., about 200° C. to about 285° C., or at about 275° C. The leaching of the solid can be, for example, carried out over a period of about 2 to about 36 hours, about 6 to about 24 hours, about 8 to 16 hours, or about 12 hours. The leaching of the solid can be, for example, carried out by using a $H_2SO_4$ solution having a concentration of about 50% to about 98%, about 70% to about 98%, or at least about 95%. In the hydrochlorinating step, for example, at least 60%, at least 70%, or about 85 to about 95% by weight of the Al atoms contained in the aluminium dross residues can be converted into aluminium chloride.

In the processes of the present invention, when two leaching steps are carried out i.e. a HCl leaching step and a $H_2SO_4$ leaching step, for example, at least 70%, at least 80%, or about 92% to about 98% by weight of the Al atoms contained in the aluminium dross residues can be extracted therefrom.

In the processes of the present invention for preparing alumina, the convertion of aluminium chloride into alumina can be, for example, carried out by pyrolizing or pyrohydrolizing the aluminium chloride so as to obtain alumina. Such a step can be, for example, carried out at a temperature of about 100° C. to about 1400° C., about 200° C. to about 1300° C., betwe 800 and 1200° C., or at about 1150° C. This step can be, for example, carried out over a period of about 0.5 to about 6 hours, about 1 to about 3 hours, or over a period of about 1.5 hours.

In the processes of the present invention for preparing alumina, when only one leaching step is carried out i.e. a leaching step with HCl, for example, at least 20%, or at least 30% by weight of the Al atoms contained in the aluminium dross residues can thereby be recovered. Alternatively, about 35 to about 40% by weight of the Al atoms contained in the aluminium dross residues can be recovered. Under such conditions, the alumina obtained can have, for example, a purity of least 65%, at least 80%, or about 90 to about 98%.

In the processes of the present invention for preparing alumina, when two leaching steps are involved i.e. a HCl leaching step and a $H_2SO_4$ leaching step, for example, at least 50%, at least 70%, or about 80% to about 95% by weight, of the Al atoms contained in the aluminium dross residues can thereby be recovered. The alumina obtained can have, for example, a purity of at least 80%, at least 90%, or of at least 93%. Alternatively, the purity can be of about 93 to about 99%. The so-obtained alumina can be further milled.

In the processes of the present invention for preparing alumina, when two leaching steps are involved i.e. a HCl leaching step and a $H_2SO_4$ leaching step, in the conversion from aluminium chloride to alumina, for example, at least 50%, at least 70%, or about 80% to about 95% by weight of the Al atoms contained in the aluminium dross residues can thereby be obtained in the form of alumina.

BRIEF DESCRIPTION OF DRAWINGS

In the following drawings, which represent by way of example only, various embodiments of the invention:

FIG. 1 shows a bloc diagram of a process according to one embodiment of the present invention.

DETAILED DESCRIPTION OF THE INVENTION

Figure 2:
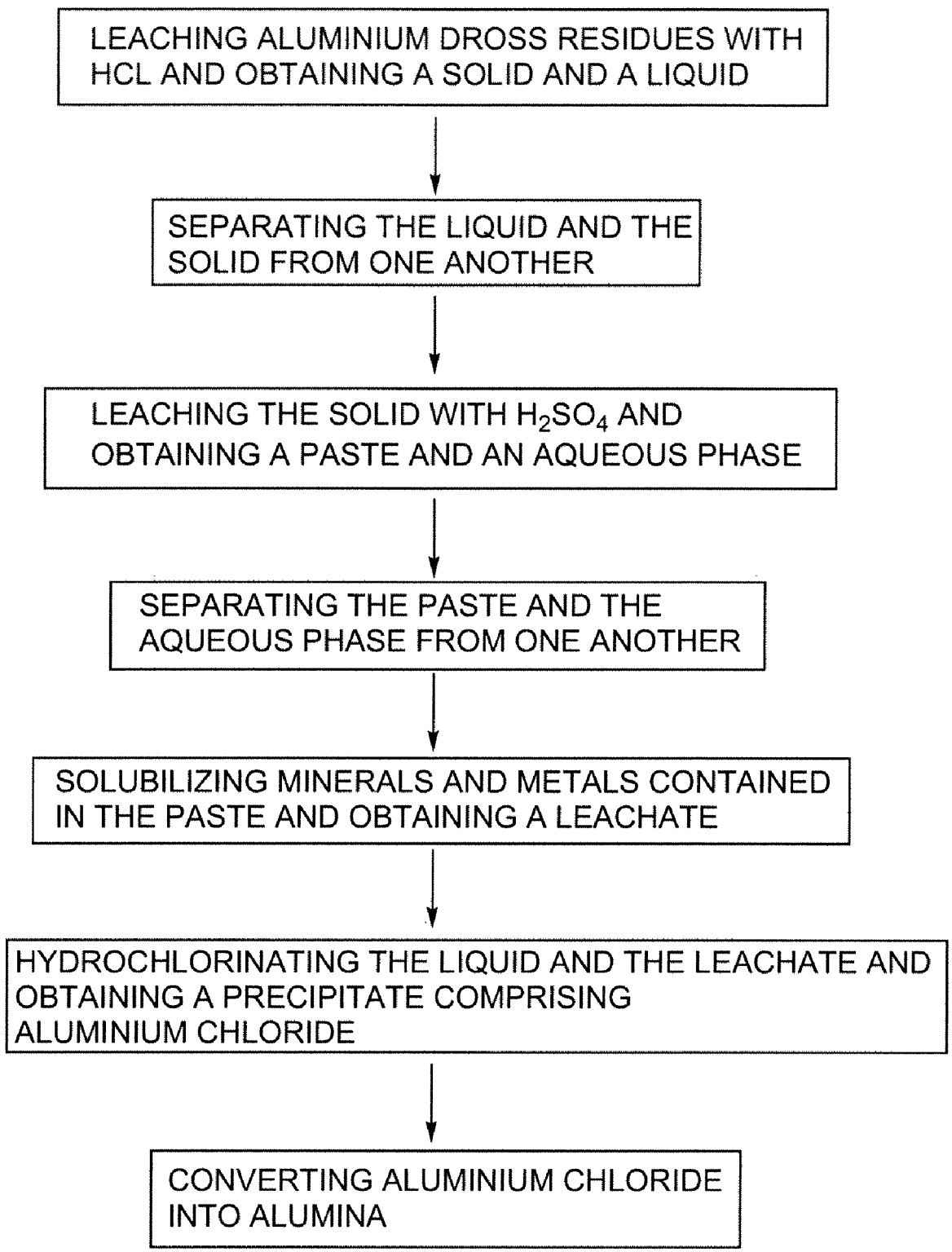
FIG. 2 shows a bloc diagram of a process according to another embodiment of the present invention.

Further features and advantages of the invention will become more readily apparent from the following description of various embodiments as illustrated by way of examples only in the appended drawings wherein:

As it can be seen from FIG. 1, such a process is relatively simple and it can be carried out easily without requiring tedious tasks. The aluminium dross residues are first treated with HCl so as to obtain a mixture comprising a solid and a liquid. Then, for example, upon filtration, the two phases (liquid and solid) can be separated from one another. The liquid is then hydrochlorinated, for example, by using gaseous HCl, thereby forming aluminium chloride. The aluminium chloride so-obtained can eventually be converted into alumina via a pyrolisis. Alternatively, aluminium chloride can be converted into alumina by means of a pyrohydrolysis according to the following reaction:

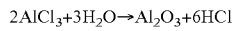

As shown in FIG. 2, the aluminium dross residues are treated with HCl and a mixture comprising a solid and a liquid is obtained. The mixture is treated, for example by filtration, so as to separate the liquid from the solid. The solid is then submitted to a leaching treatment with $H_2SO_4$ and a solid containing various minerals and metals such as sulphates is thus obtained. This solid is then treated with an aqueous solution so as to solubilize the minerals and metals contained therein, thereby providing a leachate, which can comprise sulphates. Then, the liquid and the leachate are combined together, and they are hydrochlorinated for example by means of gaseous HCl. Aluminium chloride is so obtained. The aluminium chloride can then be washed with HCl and finally converted into alumina. Alternatively, the two liquids can be chlorinated separately and the corresponding aluminium chloride batches can be separately converted into alumina or the two batches of aluminium chloride can be combined together and then, they are converted into alumina together.

The following non-limiting examples further illustrate the invention.

EXAMPLES

Example 1

Treatment of Aluminium Dross Residues

The following example was carried out on aluminium dross residues, and more particularly on SEROX™. The SEROX sample contained the following components: 32.4% of alumina, 1.0% of aluminium metal, 7.0% of gibbsite (Al(OH)$_3$), 20.0% of diaoyudaoite (NaAl$_{11}$O$_{17}$), 0.5% of sylvite (KCl), 2.5% of halite (NaCl), 2.0% of cryolite (Na$_3$AlF$_6$), 3.1% of mica, 0.5% of sodalite (Na$_4$Al$_3$Si$_3$O$_{12}$Cl), 2.5% of Ca$_2$SiO$_4$, 1.8% of albite (NaAlSi$_3$O$_8$), 1.0% of fluorite CaF$_2$ and humidity. It was calculated that the theoretical yield of 100% conversion of all the Al atoms contained in the dross residues into alumina would provide an amount of 24.9 g of alumina.

The process can comprise from 2 to 4 steps (Steps A, B, C and D) and, in accordance with the steps carried out, different final products (aluminium chloride or alumina) will be obtained and the percentage of Al atoms recovered from the aluminium dross residues will also vary. As previously indicated, each process or treatment comprises at least one HCl leaching step (Step A) and one hydrochlorinating step (Step C). Optionally a $H_2SO_4$ leaching step (Step B) can be carried out and a conversion from aluminium chloride to alumina can also be optionally carried out (Step D), when the desired final product is alumina.

Step A: HCl leaching step

In the HCl leaching step, the aluminium dross residues are dissolved in HCl 37% at a temperature of about 80° C., under constant stirring, and for a period of about 8 hours. About 40.0 g of SEROX were introduced in a reactor and 160.0 mL of HCl 37% were introduced therein and the mixture was kept under stirring at the aforesaid temperature. Then, when the leaching was completed, about 70 mL of water were added to the mixture so as to dilute HCl and permit to the so-formed aluminium chloride to be completely solubilized in the mixture. The mixture was then heated at 60° C. and stirred for a period of 15 minutes so as to maximize the solubilization. Then, when the mixture was back at room temperature, it was filtered under vacuum (polypropylene or silica filter) and the so-obtained solid was washed with about 20 mL of water so as to obtain about 250 mL of a liquid (Step A liquid) and a solid (about 17.4 g).

The so-obtained liquid can then directly be hydrochlorinated with gaseous HCl as described in Step C so as to obtain aluminium chloride. It can also be kept for being hydrochlorinated with another liquid (or leachate) obtained during the $H_2SO_4$ leaching step (Step B leachate).

Step B: $H_2SO_4$ leaching step

The solid obtained in Step A (17.4 g) is then optionally treated with 300 mL of $H_2SO_4$ 98%. The reaction is carried out at 275° C., over a period of about 8 hours and under stirring. When the reaction is completed, the heating is stopped and the obtained mixture is stirred until room temperature is obtained. Then, the mixture is filtered under vacuum and about 240 mL of an aqueous phase (unreacted $H_2SO_4$) and a solid (for example a paste or gel) containing residues ($H_2SO_4$, minerals and metals (such as sulfates)) are recovered.

The paste is then mixed with 250 mL of water and the so-obtained mixture is stirred and heated at a temperature of about 100° C. in order to solubilize the metals and minerals contained therein. Then, the hot mixture is filtered under vacuum and a first fraction of a leachate is obtained. The solid residue is recovered and treated with 30 mL of water so as to carry out a further dissolution at warm temperature, and then a further filtration, so as to obtain a second fraction of the leachate. Both fractions are combined together so as to provide about 250 mL of the leachate (Step B leachate).

Step C: Hydrochlorination step

For such a step, the Step A liquid (which is also a leachate) and the Step B leachate can be combined and treated together or they can be treated separately.

The Step A liquid (250 mL) and the Step B leachate (250 mL) were combined together and cooled at −10° C. Then, they were treated with gaseous HCl and the reaction was carried out at a temperature of about −4° C. to about −10° C. The hydrochlorination is carried out until the solution is saturated. The gaseous HCl thereby introduced causes aluminium chloride to precipitate. Then, the so-obtained cold mixture is filtered under vacuum so as to provide about 201 g of aluminium chloride hydrate and 470 mL of a waste liquid. The aluminium chloride so-obtained is purified by washing it with HCl 37% at −10° C., so as to provide 183 g of purified aluminium chloride hydrate.

Step D: Pyrohydrolysis of aluminium chloride into alumina

The aluminium chloride obtained in Step C is then optionally converted into alumina by means of a pyrohydrolysis.

The aluminium chloride is rinsed and mixed with about 10 mL of water before being heated at about 200° C. during 1 hour in order to convert the aluminium chloride into alumina and gaseous HCl. Then, the so-obtained alumina is further heated at about 950° C. during 2 hours so as to convert it into the alpha form of alumina. The alumina is then washed 100 mL of acidified deionized water so as to solubilze cationic impurities in the form of oxides. The alumina is then washed and dried at 100° C. over a period of 2 hours, thereby providing 24 g of alumina having a degree of purity of at least 98%. As previously indicated the 100% theoretical yield of conversion of all the Al atoms contained in the dross residues should provide 24.9 g of alumina. Therefore, the yield for converting the Al atoms of the dross residues into alumina was 96.4%. It can also be said that the yield for converting the Al atoms of the dross residues into aluminium chloride was at least of 96.4%.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A process for treating aluminium dross residues comprising:
    leaching aluminium dross residues with HCl so as to convert a portion of the Al atoms contained in said aluminium dross residues into aluminium chloride solubilized in a liquid and to obtain a mixture comprising a solid and said liquid, and separating said liquid from said solid;
    leaching said solid with $H_2SO_4$ so as to convert a portion of the Al atoms contained in said solid into aluminium sulphates and to obtain a mixture comprising another solid containing aluminium sulphates and another liquid, and separating said another solid from said another liquid;
    solubilizing in water at least a portion of said aluminium sulphates contained in said another solid so as to obtain a leachate; and
    hydrochlorinating said liquid and said leachate, thereby forming a precipitate comprising aluminium chloride.

2. The process of claim 1, wherein the leaching of said dross residues with HCl is carried out at a temperature of about 20° C. to about 140° C.

3. The process of claim 1, wherein the leaching of said dross residues with HCl is carried out at a temperature of about 40° C. to about 120° C.

4. The process of claim 1, wherein the leaching of said dross residues is carried out by using a HCl solution having a concentration of about 10 to about 37%.

5. The process of claim 1, wherein said at least a portion of aluminium sulphates is solubilized in water having a temperature of at least 60° C.

6. The process of claim 5, wherein said liquid and said leachate are mixed together and are then hydrochlorinated.

7. The process of claim 6, wherein said liquid and said leachate are hydrochlorinated with gaseous HCl.

8. The process of claim 1, wherein the leaching of said solid with $H_2SO_4$ is carried out at a temperature of about 20° C. to about 325° C.

9. The process of claim 1, wherein the leaching of said solid with $H_2SO_4$ is carried out at a temperature of about 60° C. to about 300° C.

10. The process of claim 1, wherein the leaching of said solid is carried out by using a $H_2SO_4$ solution having a concentration of about 50 to about 98%.

11. The process of claim 9, wherein the leaching of said solid is carried out by using a $H_2SO_4$ solution having a concentration of about 70 to about 98%.

12. The process of claim 1, wherein the hydrochlorination is carried out at a temperature of about −10° C. to about 20° C.

13. The process of claim 1, wherein the hydrochlorination is carried out at a temperature of about −5° C. to about 10° C.

14. The process of claim 1, wherein in the hydrochlorination, at least 60% by weight of the Al atoms contained in the aluminium dross residues are converted into aluminium chloride.

15. The process of claim 13, wherein in the hydrochlorination about 85 to about 95% by weight of the Al atoms contained in the aluminium dross residues are converted into aluminium chloride.

16. The process of claim 1, wherein during said process at least 80% by weight of the Al atoms contained in the aluminium dross residues are extracted therefrom.

17. The process of claim 1, wherein said dross residues comprise alumina, aluminium metal, spinel ($MgAl_2O_4$), diaoyudaoite ($NaAl_{11}O_{17}$), and gibbsite ($Al(OH)_3$); alumina, aluminium, aluminium nitride, sodium oxide and magnesium oxide; or mixtures thereof.

18. A process for preparing alumina comprising:
    leaching aluminium dross residues with HCl so as to convert a portion of the Al atoms contained in said aluminium dross residues into aluminium chloride solubilized in a liquid and to obtain a mixture comprising a solid and said liquid, and separating said liquid from said solid;
    leaching said solid with $H_2SO_4$ at a temperature of about 20° C. to about 325° C. so as to convert a portion of the Al atoms contained in said solid into aluminium sulphates and to obtain a mixture comprising another solid containing aluminium sulphates and another liquid, and separating said another solid from said another liquid;
    solubilizing in water at least a portion of said aluminium sulphates contained in said another solid so as to obtain a leachate;
    hydrochlorinating said liquid and said leachate, thereby forming a precipitate comprising aluminium chloride; and
    converting said aluminium chloride into alumina.

19. The process of claim 18, wherein the conversion from aluminium chloride to alumina is carried out at a temperature of about 100° C. to about 1400° C.

20. The process of claim 18, wherein the conversion from aluminium chloride to alumina is carried out at a temperature of about 200° C. to about 1300° C.

21. The process of claim 18, wherein in the conversion from aluminium chloride to alumina, at least 50% by weight of the Al atoms contained in the aluminium dross residues are thereby obtained in the form of alumina.

22. The process of claim 18, wherein in the conversion from aluminium chloride to alumina, about 80 to about 95% by weight of the Al atoms contained in the aluminium dross residues are thereby obtained in the form of alumina.

23. The process of claim 18, wherein the alumina obtained has a purity of at least 90%.

24. A process for preparing alumina comprising:
    leaching aluminium dross residues with HCl so as to convert a portion of the Al atoms contained in said aluminium dross residues into aluminium chloride solubilized in a liquid and to obtain a mixture comprising a solid and said liquid, and separating said liquid from said solid;
    leaching said solid with $H_2SO_4$ so as to convert a portion of the Al atoms contained in said solid into aluminium sulphates and to obtain a mixture comprising another solid containing aluminium sulphates and another liq uid, and separating said another solid from said another liquid;

solubilizing in water at least a portion of said aluminium sulphates contained in said another solid so as to obtain a leachate; and hydrochlorinating said liquid and said leachate, thereby forming a precipitate comprising aluminium chloride; and converting said aluminium chloride into alumina.

* * * * *